United States Patent [19]

Vidwans et al.

[11] Patent Number: 4,909,571
[45] Date of Patent: Mar. 20, 1990

[54] VEHICLE SEAT WITH INERTIAL LATCH ASSEMBLY

[75] Inventors: Mohan P. Vidwans, Saline; Joseph B. Benson, South Lyon; Brian J. Rahn, St. Clair Shores, all of Mich.

[73] Assignee: Hoover Universal, Inc., Ann Arbor, Mich.

[21] Appl. No.: 242,865

[22] Filed: Sep. 12, 1988

[51] Int. Cl.$^4$ .............................................. B60N 1/02
[52] U.S. Cl. ..................................... 297/379; 297/216
[58] Field of Search ..................... 297/216, 378, 379; 292/25, 130, DIG. 22

[56] References Cited

U.S. PATENT DOCUMENTS

| 2,873,794 | 2/1959 | Leslie et al. | 297/379 |
| 3,549,202 | 12/1970 | Boschen et al. | 297/379 |
| 3,628,831 | 12/1971 | Close | 297/379 |
| 4,082,353 | 4/1978 | Hollowell | 297/379 |
| 4,118,067 | 10/1978 | Tanaka | 297/379 |
| 4,305,615 | 12/1981 | Osterhold | 297/379 |
| 4,365,838 | 12/1982 | Berg | 297/379 |

Primary Examiner—Peter R. Brown
Assistant Examiner—Brian K. Green
Attorney, Agent, or Firm—Harness, Dickey & Pierce

[57] ABSTRACT

An inertia sensitive latch assembly particularly adapted for preventing forward dumping of a motor vehicle seat back. The embodiments are particularly suited for applications in station wagon vehicles having forward dumping capability of the second passenger seats. The device is enclosed within the seat back and includes a pendulum engageable with a latch hook affixed to a support structure. The pendulum engages the hook when the vehicle is subjected to deceleration loads above a predetermined level. In one embodiment of the invention, a retention clip device is provided which maintains the pendulum engaged with the latch hook after a deceleration load is relieved to maintain the seat in engagement throughout multiple impact vehicle conditions. Both embodiments are substantially enclosed within the seat back cushion structure, thus protecting them and providing an unobstructed load floor when the seat back is dumped forward.

8 Claims, 3 Drawing Sheets

VEHICLE SEAT WITH INERTIAL LATCH ASSEMBLY

BACKGROUND AND SUMMARY OF THE INVENTION

This invention relates to inertial latching mechanisms particularly adapted for preventing forward folding of a motor vehicle seat back when the vehicle is exposed to a deceleration force above a predetermined level.

As a safety feature, motor vehicle seat backs which have forward folding or "dumping" capability are provided with some means to prevent forward folding of the seat back when the vehicle is exposed to significant deceleration loads which occur, for example, in vehicle frontal impact conditions. Front vehicle seats in two-door vehicles generally can be folded forward to enable access to the rear compartment area. Similarly, station wagon style vehicles often have a second seat which can be folded forward to provide a load carrying area. Manually released latching mechanisms have been used for such folding seats which require the user to actuate the mechanism before the seat back can be dumped forward. Although these devices perform satisfactorily, they are inconvenient to use. As a means of enhancing operator convenience, motor vehicle manufacturers frequently provide inertia sensitive latching mechanisms which normally enable the seat back to be freely dumped forward, but sense vehicle deceleration to lock up and prevent such dumping in vehicle impact conditions.

The inertia latch assemblies of the present invention have widespread potential application but are particularly suited for station wagons or similar vehicles to restrict forward folding of the seat back of a second passenger seat. When the seat back of the second seat of a station wagon is folded forward, it is desirable to provide a flat and unobstructed load floor. Therefore, the latching mechanism for the seat back should not present obtrusive projections in the load floor area. The latch assemblies according to this invention provide inertia sensitive operation, are simple in terms of their design, operation and assembly, and are fully enclosed within the seat back structure for protection.

In accordance with this invention, inertial latch assemblies are provided which are mounted within a seat back foam pad. A latching hook coupled to a seat support structure engages the inertial latch pendulum through an aperture in the seat back. In order to enhance the reliability of operation of the device, the pendulum forms a cam surface which rotates the pendulum into an engaging position upon contact with the latch hook when the seat back is in its normal upright position. Forward movement of the seat back causes the pendulum to rotate out of engagement with the hook, unless the vehicle is exposed to deceleration loads above a predetermined level, in which case the pendulum remains in engagement with the latching hook.

In accordance with a second embodiment of the invention, an inertial latch assembly is provided which further incorporates a retaining clip which maintains the pendulum in an engaging position after the vehicle deceleration loads are relieved. The clip prevents disengagement of the pendulum in multiple vehicle impact situations in which the vehicle may experience repeated deceleration loads over a short duration.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
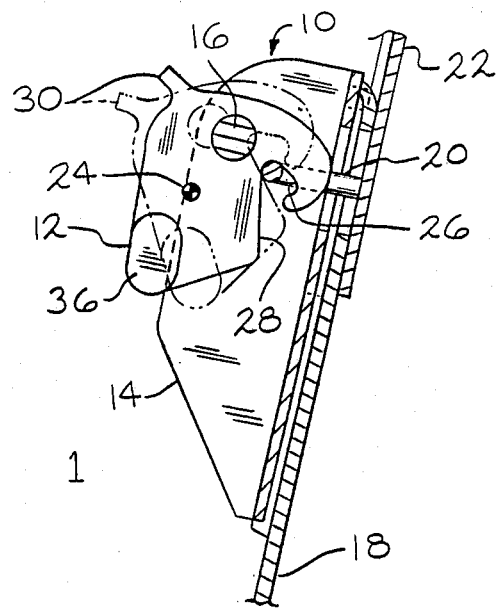
FIG. 1 is a cross-sectional view illustrating the inertial latch assembly according to a first embodiment of this invention shown mounted to a seat back and engaging a latch hook. The phantom line and full line views of the pendulum illustrate its various positions as the seat back is rotated from a folded forward position to its normal upright position.
Figure 2:
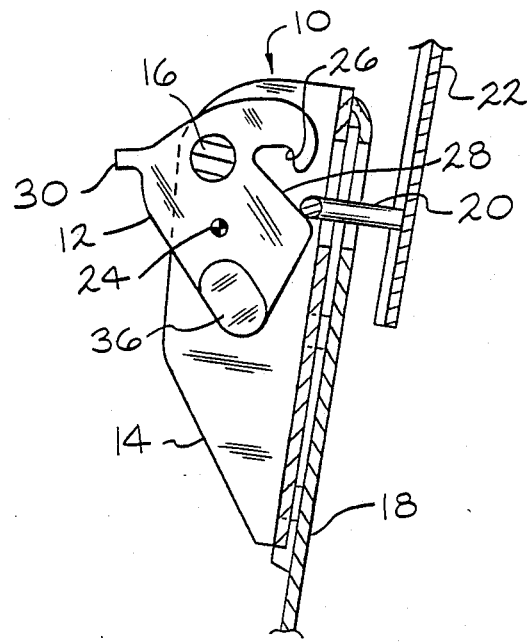
FIG. 2 is a cross-sectional view similar to FIG. 1 but showing initial motion of the seat back being folded forward when the vehicle is not subjected to deceleration forces.
Figure 3:
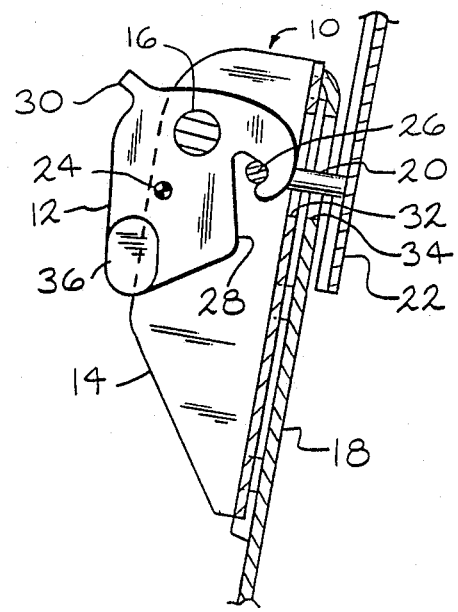
FIG. 3 is a cross-sectional view similar to FIG. 1 but showing the seat back being restrained against forward folding due to deceleration forces acting on the vehicle.

FIGS. 1 through 3 illustrate an inertial latch assembly in accordance with a first embodiment of this invention which is generally designated by reference number 10. Latch assembly 10 principally comprises pendulum 12, mounting bracket 14 and pivot post 16. The assembly is shown with bracket 14 affixed to a seat back rear panel 18 and engageable with latch hook 20 fastened to support structure 22.

Pendulum 12 is rotatable about pivot post 16 which is positioned above its center of gravity designated by reference number 24. Pivot post 16 is carried for rotation by bracket 14 and provides a low friction bearing for swinging of the pendulum. Weighted section 36 is provided to produce the desired pendulum mass and center of gravity location and is formed integrally with the pendulum or may be a separately added component. A rear facing notch 26 is formed by the pendulum which defines an engagement tooth 29 with cam surface 28 leading into the notch. Bracket 14 and rear panel 18 each include apertures 32 and 34, respectively, which provide clearance for entrance of latch hook 20 for engagement with pendulum 12. Latch hook 20 may be made in various configurations but is preferably a generally "U" shaped hook fastened to support structure 22.

FIG. 1 shows the seat back being returned from a forward folded position to its normal upright position. Latch hook 20 initially engages cam surface 28 as shown in phantom lines in the figures. Continued rearward rotation of the seat back causes pendulum 12 to rotate in a clockwise direction to the full line position shown in FIG. 1. At the final position, the configuration of notch 26 and cam surface 28 forces pendulum 12 to be rotated such that latch hook 20 is in registry with tooth 29.

Under normal operating circumstances, when the vehicle user wishes to dump the seat back forward, it may be simply grasped and folded without resistance. Such motion moves the seat back away from the support structure as shown in FIG. 2 and, as the biasing caused by the interaction of cam surface 28 with hook 20 is relieved, the position of the center of gravity 24 causes the pendulum to be rotated in a counterclockwise direction, thus enabling latch hook 20 to escape engagement with tooth 29. If, however, the vehicle is subjected to deceleration loads above a predetermined level, as shown in FIG. 3, a clockwise force is exerted on pendulum 12, maintaining latch hook 20 in engagement with tooth 29, and thereby preventing unrestricted forward dumping of the seat back.

As is evident from the figures of this first embodiment, when the seat back is in its folded forward position, latch assembly 10 is protected from damage since it is enclosed inside the seat back. This configuration also provides a flat load floor area free of obstructions when the seat back is folded forward.

Figure 4:
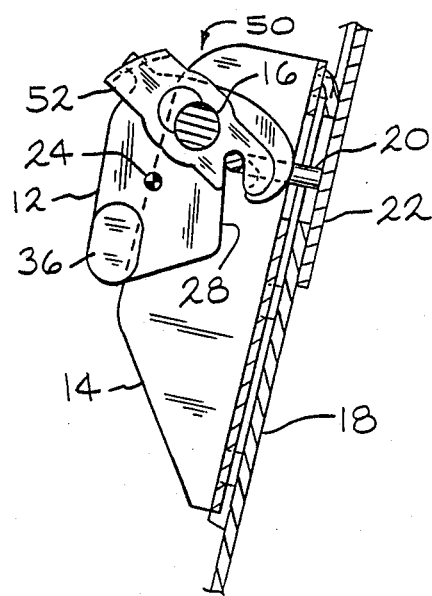
FIG. 4 is a cross-sectional view showing a latch assembly according to a second embodiment of this invention incorporating a latch retaining clip in its normal position.
Figure 5:
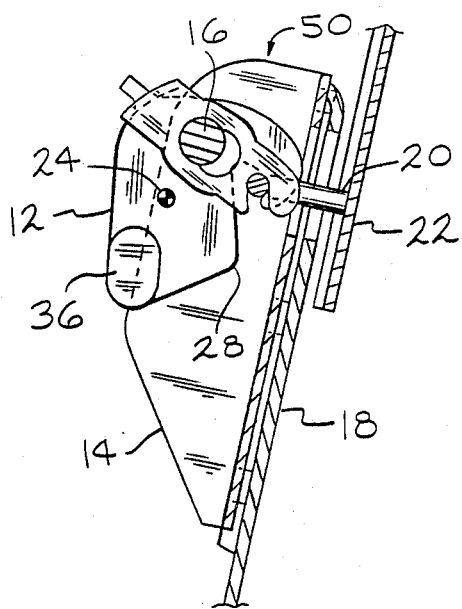
FIG. 5 is a cross-sectional view similar to FIG. 4 but showing the retaining clip displaced to its active position preventing disengagement of the pendulum engagement notch with the latch hook.
Figure 6:
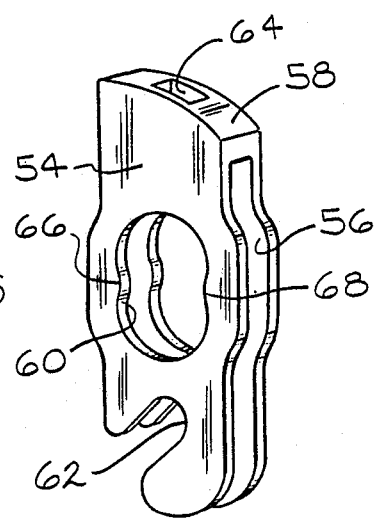
FIG. 6 is a pictorial view of the retainer clip shown in FIGS. 4 and 5.

An inertial latch assembly in accordance with a second embodiment of this invention is illustrated in FIGS. 4 through 6, and is generally designated by reference number 50. Latch assembly 50 is identical to latch assembly 10 with the exception that a latch retaining clip 52 is provided. Elements of this embodiment which are identical to latch assembly 10 are identified by like reference numbers. Retaining clip 52 serves to maintain pendulum 12 in its engaging position after deceleration levels above the predetermined level are relieved so as to maintain the pendulum in engagement in multiple impact conditions.

As best shown in FIG. 6, retaining clip 52 has two separated walls 54 and 56 joined together at end 58. Walls 54 and 56 form an oblong center opening 60 and retaining notch 62. Retaining clip 52 is installed onto pendulum 12 as shown in FIG. 5 with the walls 54 and 56 enveloping the pendulum. Opening 60 is disposed around pivot post 16 and is normally oriented in the position shown in FIG. 4 with pivot post 16 positioned at the end of opening 60 adjacent retaining notch 62. Inwardly directed ribs 66 and 68 of aperture 60 maintain the pivot post 16 at either end of opening 60. Retaining clip guide arm 30 of pendulum 12 projects from a small aperture 64 through end 58 and is provided to keep retaining clip 52 from rotating out of position.

With retaining clip 52 in the position shown in FIG. 4, pendulum 12 is permitted to swing between engaging and disengaging positions. When a vehicle deceleration load is experienced causing pendulum 12 to remain in a position for engagement of tooth 29 with latch hook 20, the latch hook also engages retaining notch 62, pulling retaining clip 52 past ribs 66 and 68 to the position shown in FIG. 5. Retaining clip 52 is prevented from rotating about pivot post 16 by the interaction of arm 30 and clip aperture 64. In that position, pivot post 16 engages the region of opening 60 displaced from retaining notch 62 where the retaining notch and pendulum notch 26 cooperate to trap latch hook 20 in the position shown in FIG. 5, thus resisting disengagement of the latch hook and maintaining the seat back in a locked condition. As is evident from FIG. 5, the trapping of latch hook 20 occurs since pendulum tooth 29 interferes with escape of the hook through retaining notch 62. Disengagement of pendulum 12 is achieved by pushing the seat back to the design position shown in FIG. 4 thereby sliding retaining clip 52 into its normal operating position.

While the above description constitutes the preferred embodiments of the present invention, it will be appreciated that the invention is susceptible of modification, variation and change without departing from the proper scope and fair meaning of the accompanying claims.

We claim:

1. An inertia sensitive latch assembly for preventing a motor vehicle seat back from folding from a normal upright position to a folded forward position when exposed to deceleration loads above a predetermined level comprising:

a latch hook affixed to a vehicle seat support structure, a pendulum affixed to said seat back and having a pivot means for enabling rotation of said pendulum, said pendulum having its center of gravity below a horizontal line passing through said pivot means and defining a rearward facing notch, a tooth for engaging said latch hook and a cam surface, said pendulum interacting with said hook such that as said seat back is moved from said folded to said normal upright position, said hook contacts said cam surface and rotates said pendulum to a position of engagement with said latch hook, and when said seat back is moved from said upright position toward said folded position when said vehicle is not exposed to said deceleration loads, said pendulum is rotated out of engagement with said hook, and when seat back is urged from said upright position toward said folded position when said vehicle is exposed to said deceleration loads, said pendulum remains in engagement with said locking hook, bracket means for supporting said pendulum such that said pendulum is enclosed by said seat back and said hook passes through an aperture in said seat back to interact with said pendulum; and a retaining clip affixed to said pendulum, said clip being affixed to said pendulum by movable mounting means enabling said clip to shift between a normal position enabling said hook to freely engage and disengage said pendulum notch and a retaining position maintaining said pendulum in said engaged position, said clip having a hook engaging feature which contacts said hook when said vehicle is subjected to said loads to move said clip from said normal position to said retaining position and for engaging said hook when in said retaining position to prevent escape of said hook from said pendulum notch thus maintaining said pendulum in engagement with said hook.

2. An inertia sensitive latch for preventing a motor vehicle seat back from folding from a normal upright position to a folded position when exposed to deceleration loads above a predetermined level comprising:

a latch hook affixed to a vehicle seat support structure;

a pendulum affixed to said seat back and having pivot means for enabling rotation of said pendulum, and defining a notch and a tooth for engagement with said latch hook, and a retaining clip affixed to said pendulum, said clip being affixed to said pendulum by movable mounting means enabling said clip to shift between a normal position enabling said hook to freely engage and disengage said pendulum notch and a retaining position maintaining said pendulum in a position engaged with said hook, said clip having a hook engaging feature which contacts said hook when said vehicle is subjected to said loads to move said clip from said normal position to retaining position and for engaging said hook when in said retaining position to prevent escape of said hook from said pendulum notch thus maintaining said pendulum in engagement with said hook.

3. An inertia sensitive latch according to claim 2 wherein said retaining clip has an oblong engaging hole and said pivot means comprises a shaft which is received by said engaging hole.

4. An inertia sensitive latch according to claim 2 further comprising bracket means for supporting said pendulum such that said pendulum is enclosed by said seat back and said hook passes through an aperture in said seat back to interact with said pendulum.

5. An inertia sensitive latch according to claim 2 wherein said pendulum notch is rearward facing and said retaining clip forms a pair of separated walls which embrace said pendulum.

6. An inertia sensitive latch according to claim 5 wherein said pendulum defines a manual release arm and said separated walls are connected by an end wall having an aperture receiving said pendulum arm.

7. An inertia sensitive latch according to claim 2 wherein said hook engaging feature comprises a notch oriented such that in said retaining position, said pendulum tooth and said clip interfere with escape of said latch hook from said pendulum notch.

8. An inertia sensitive latch assembly for preventing a motor vehicle seat back from folding from a normal upright position to a folded forward position when exposed to deceleration loads above a predetermined level comprising:

a latch hook affixed to a vehicle seat support structure, a pendulum affixed to said seat back and having a pivot means for enabling rotation of said pendulum, said pendulum having its center of gravity below said pivot means and defining a rearward facing notch, a tooth for engaging said latch hook and a cam surface, said pendulum interacting with said hook such that as said seat back approaches said normal upright position, said hook contacts said cam surface and rotates said pendulum to a position of engagement with said latch hook, and when said seat back is moved from said upright position toward said folded position when said vehicle is not exposed to said deceleration loads, said pendulum is rotated out of engagement with said hook, and when said seat back is moved from said upright position toward said folded position when said vehicle is exposed to said deceleration loads, said pendulum remains in engagement with said locking hook, bracket means for supporting said pendulum such that said pendulum is enclosed by said seat back and said hook passees through an aperture in said seat back to interact with said pendulum, and a retaining clip affixed to said pendulum, said clip affixed to said pendulum by movable mounting means enabling said clip to shift between a normal position enabling said hook to freely engage and disengage said pendulum notch and a retaining position maintaining said pendulum in said engaged position, said clip having a hook engaging feature which contacts said hook when said vehicle is subjected to said loads to move said clip from said normal position to said retaining position and for engaging said hook when in said retaining position to prevent escape of said hook from said pendulum notch thus maintaining said pendulum in engagement with said hook.

* * * * *